(12) United States Patent
Wellbrock et al.

(10) Patent No.: US 9,002,196 B2
(45) Date of Patent: Apr. 7, 2015

(54) SELF-HEALING REPEATER NODE

(71) Applicant: Verizon Patent and Licensing, Inc., Basking Ridge, NJ (US)

(72) Inventors: Glenn A. Wellbrock, Wylie, TX (US); Tiejun J. Xia, Richardson, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 129 days.

(21) Appl. No.: 13/849,782

(22) Filed: Mar. 25, 2013

(65) Prior Publication Data

US 2013/0230310 A1 Sep. 5, 2013

Related U.S. Application Data

(62) Division of application No. 12/486,916, filed on Jun. 18, 2009, now Pat. No. 8,428,462.

(51) Int. Cl.
*G02F 1/00* (2006.01)
*H04B 10/038* (2013.01)
*H04Q 11/00* (2006.01)

(52) U.S. Cl.
CPC ......... *H04B 10/038* (2013.01); *H04Q 11/0003* (2013.01); *H04Q 2011/0081* (2013.01)

(58) Field of Classification Search
CPC ............... H04B 10/071; H04B 10/073; H04B 10/0731; H04B 10/077; H04B 10/0771; H04B 10/0777; H04B 10/038
USPC ........................................................ 398/1–33
See application file for complete search history.

(56) References Cited

U.S. PATENT DOCUMENTS

| | | | | |
|---|---|---|---|---|
| 6,005,694 | A | * | 12/1999 | Liu ................................... 398/6 |
| 2004/0047295 | A1 | * | 3/2004 | Morreale ...................... 370/241 |
| 2007/0077067 | A1 | * | 4/2007 | Wellbrock et al. .............. 398/45 |

* cited by examiner

*Primary Examiner* — M. R. Sedighian

(57) ABSTRACT

A device may include a component, a first switch, a repeater, and a second switch. The component may configure optical paths between ports. The component may comprise a first pair of optical ports connected to a first pair of optical fibers, and a second pair of optical ports connected to a second pair of optical fibers. The first switch may be configured to output one of two optical signals received by the first pair of optical ports from the first pair of optical fibers. The repeater may reshape or amplify the outputted optical signal. The second switch may be configured to direct the reshaped or amplified signal to one of the second pair of optical ports.

20 Claims, 7 Drawing Sheets

SELF-HEALING REPEATER NODE

RELATED APPLICATION

The present application is a divisional of U.S. patent application Ser. No. 12/486,916, filed Jun. 18, 2009, the disclosure of which is hereby incorporated by reference herein.

BACKGROUND INFORMATION

Optical amplifiers and regenerators may restore power and shape to degraded optical signals. Optical signals between a central office to a customer premise often pass through either optical amplifiers and/or regenerators, because, as the optical signals travel through a fiber, the signals may attenuate and/or become distorted.

DETAILED DESCRIPTION OF PREFERRED EMBODIMENTS

The following detailed description refers to the accompanying drawings. The same reference numbers in different drawings may identify the same or similar elements.

As described below, a self-healing (SH) repeater node may be used instead of an optical regenerator node and/or amplifier node. When a component of the SH repeater node fails (e.g., an optical fiber, an amplifier pump, etc.), the SH repeater node may detect the failure and/or fix the component. For example, if the SH repeater node detects a fault/flaw (e.g., a break) in optical fiber, the SH repeater node may allow a network operator to test the broken fiber, identify the location of the fault/flaw, and re-route a communication signal from the broken fiber to another fiber. The SH repeater node may perform these operations automatically or in accordance with commands issued from a remote device.

In addition, the SH repeater node may be space compact. Typically, a legacy regenerator or amplifier is installed in a large housing to provide convenient access to an engineer, service person, etc. Because the SH repeater node may repair itself, it may not need to provide such access, and consequently, may be placed in a compact container, manhole, hand hole, etc. In addition, because the SH repeater node may be environmentally hardened, it may withstand temperature changes, moisture, wind, radiation, vibrations, etc.

The SH repeater node may integrate many different components (e.g., a test equipment for remote troubleshooting) to lower the failures-in-time (e.g., to less than 5000 failures/billion unit-hours of operating time), and to support, if necessary, local maintenance activity. In addition, the SH repeater node may be energy efficient (e.g., 100 W).

Figure 1:
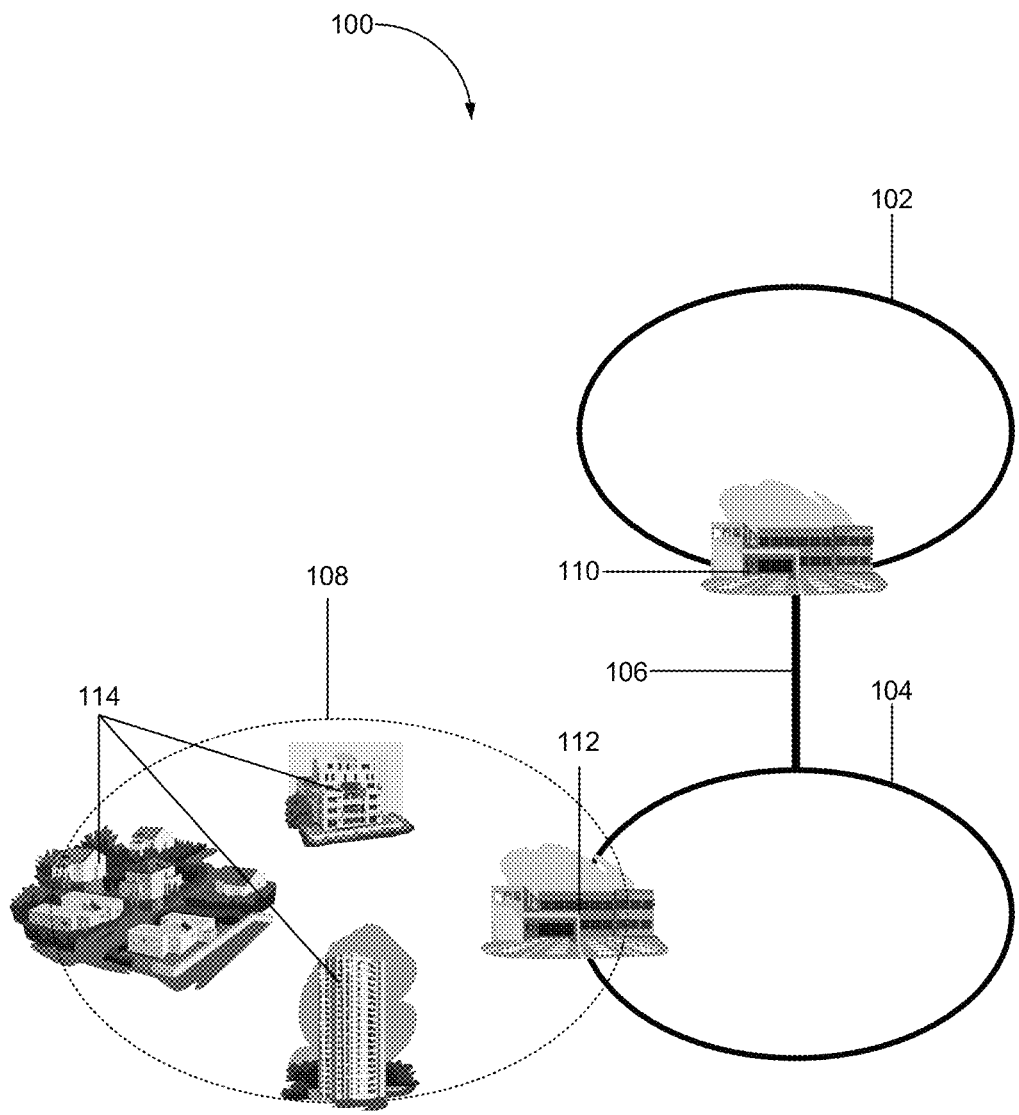
FIG. 1 illustrates an exemplary optical network in which concepts described herein may be implemented.

FIG. 1 shows an exemplary optical network 100 in which the concepts described herein may be implemented. As shown, optical network 100 may include metro/regional networks 102 and 104, long haul or ultra-long haul optical lines 106, and edge network 108. Depending on the implementation, optical network 100 may include additional, fewer, or different optical networks and optical lines than those illustrated in FIG. 1. For example, in one implementation, optical network 100 may include additional edge networks and/or metro/regional networks that are interconnected by Synchronous Optical Network (SONET) rings.

Metro/regional network 102 may include optical fibers and central office hubs that are interconnected by the optical fibers. The optical fibers, which may form the backbone of metro/regional optical network 102, may span approximately 50 to 500 kilometers (km). The central office hubs, one of which is illustrated as central office hub 110, may include sites that house telecommunication equipment, including switches, optical line terminals, etc. In addition to being connected to other central offices, central office hub 110 may provide telecommunication services to subscribers, such as telephone service, access to the Internet, cable television programs, etc., via optical line terminals.

Metro/regional network 104 may include similar components as metro/regional network 102 and may operate similarly. In FIG. 1, metro/regional network 104 is illustrated as including central office hub 112, which may include similar components as central office hub 110 and may operate similarly.

Long haul optical lines 106 may include optical fibers that extend from metro/regional optical network 102 to metro/regional optical network 104. In some implementations, long haul optical lines 106 may span approximately 500 km or more.

Edge network 108 may include optical networks that provide user access to metro/regional optical network 104. As shown in FIG. 1, edge network 108 may include access points 114 (e.g., office buildings, residential area, etc.) via which end customers may obtain communication services from central office hub 112.

Figure 2A:
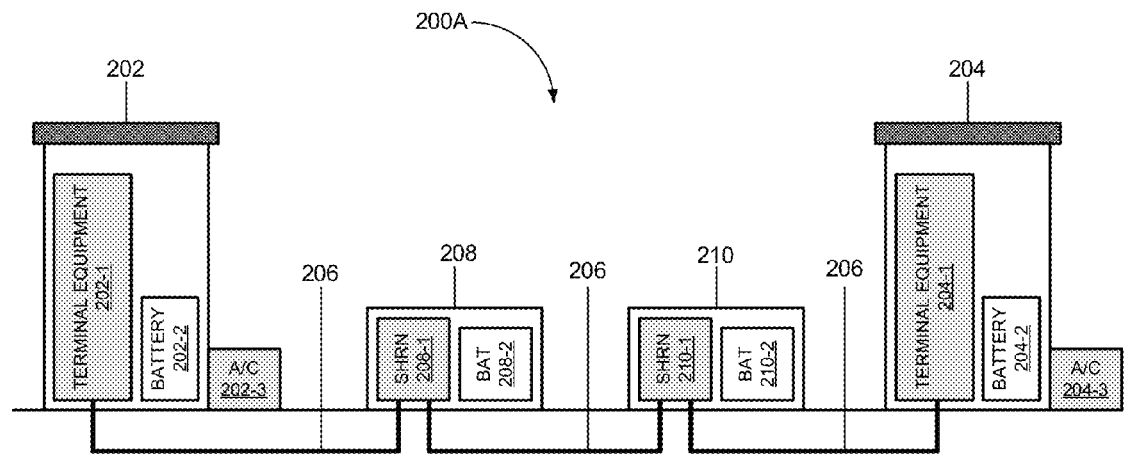
FIGS. 2A through 3B are diagrams of an exemplary portion of the optical network of FIG. 1.

FIG. 2A is a diagram of an exemplary portion 200A of optical network 100. Portion 200A may be part of metro/regional network 102, metro/regional network 104, or long haul optical lines 106. As shown, portion 200A may include central office hubs 202 and 204, optical fibers 206, and node facilities 208 and 210. Depending on the implementation, portion 200A may include additional, fewer, or different components than those illustrated in FIG. 2A (e.g., additional node facilities).

Central office hub 202 or central office hub 204 may include telecommunication equipment, including switches, optical line terminals, etc., and may provide telecommunication services to subscribers, such as telephone service, access to the Internet, cable television programs, etc., via optical line terminals.

For example, in FIG. 2A, central office hub 202 may include terminal equipment 202-1, a battery 202-2, and an air-conditioning unit 202-3. Terminal equipment 202-1 may include components for optical telecommunications (e.g., optical switches, optical line terminals, etc.). Battery 202-2 (or a power adaptor) may provide power to terminal equipment 202-1. Air conditioning unit 202-3 may provide a stable temperature for terminal equipment 202-1.

Optical fibers 206 may connect central office hubs 202 and 204, and may convey optical signals from/to central office hub 202 to/from central office hub 204. As shown, optical fibers 206 pass through node facilities 208 and 210.

Node facility 208 or 210 may include SH repeater nodes 208-1 or 210-1 to amplify and/or regenerate an optical signal that arrives from central office hub 202 or 204 via optical fibers 206 and transmit the amplified signal toward central office hub 204 or 202. As shown in FIG. 2A, node facilities 208 and 210 may include enclosures (e.g., cabinets) in which SH repeater nodes 208-1 and 210-1, respectively, may be housed. SH repeater nodes 208-1 and 210-1 may be powered by, respectively, batteries 208-2 and 210-2 that are included in node facilities 208 and 210. In a different implementation, node facilities 208 and 210 may include different components (e.g., a power adaptor).

Figure 2B:
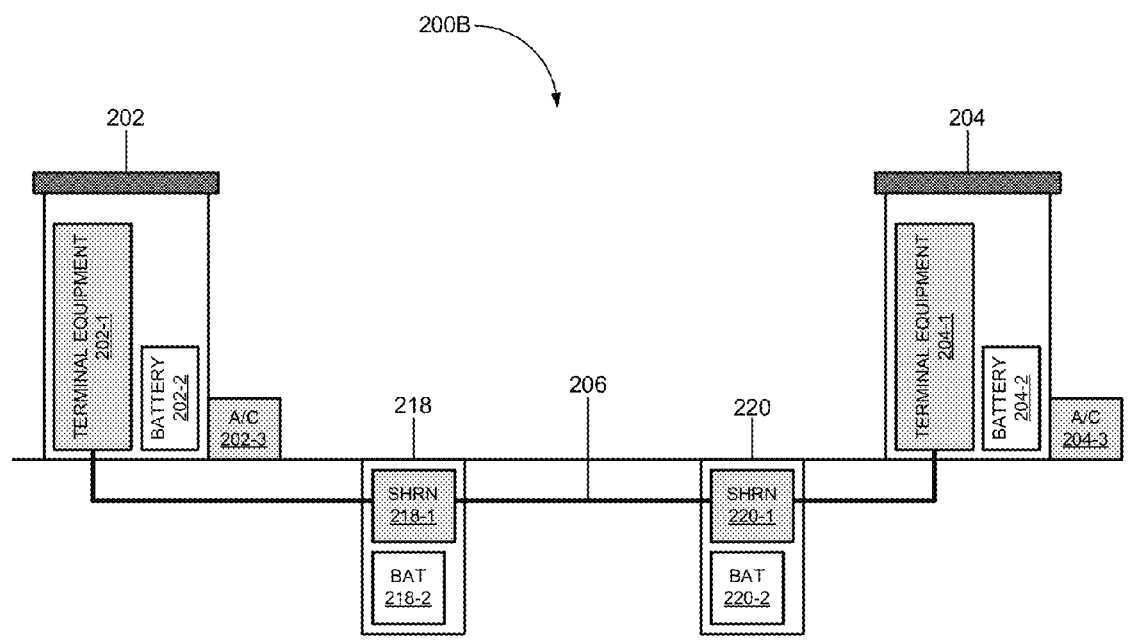

FIG. 2B is a diagram of another exemplary portion 200B of optical network 100. Portion 200B may be part of metro/regional network 102, metro/regional network 104, or long haul optical lines 106. As shown, portion 200B may include central office hubs 202 and 204, optical fibers 206, and node facilities 218 and 220. Depending on the implementation, portion 200B may include additional, fewer, or different components than those illustrated in FIG. 2B (e.g., additional node facilities).

Node facility 218 and node facility 220 may include components (e.g., SH repeater node 218-1 and battery 218-2) that correspond to components of node facility 208 (e.g., SH repeater node 208-1 and battery 208-2) and node facility 210, respectively. In addition, node facilities 218 and 220 may operate similarly as node facilities 208 and 210.

In contrast to node facilities 208 and 210, however, node facilities 218 and 220 may include enclosures that are under- or in-ground (e.g., man-hole, hand-hole, etc.). The enclosures may house SH repeater nodes 218-1 and 220-1 and batteries 218-2 and 220-2.

In the exemplary embodiments of FIGS. 2A and 2B, the enclosures in node facilities 208, 210, 218, and 220 may be constructed just large enough to house SH repeater nodes 208-1, 210-1, 218-1 and 220-1, and/or batteries 208-2, 210-2, 218-2, and 220-2. Such implementations may save space and reduce cost that is associated with a larger housing. SH repeater nodes 208-1, 210-1, 218-1, and 220-1 may be environmentally hardened, and may be capable of withstanding large swings in temperature, moisture, vibration, etc.

Figure 3A:
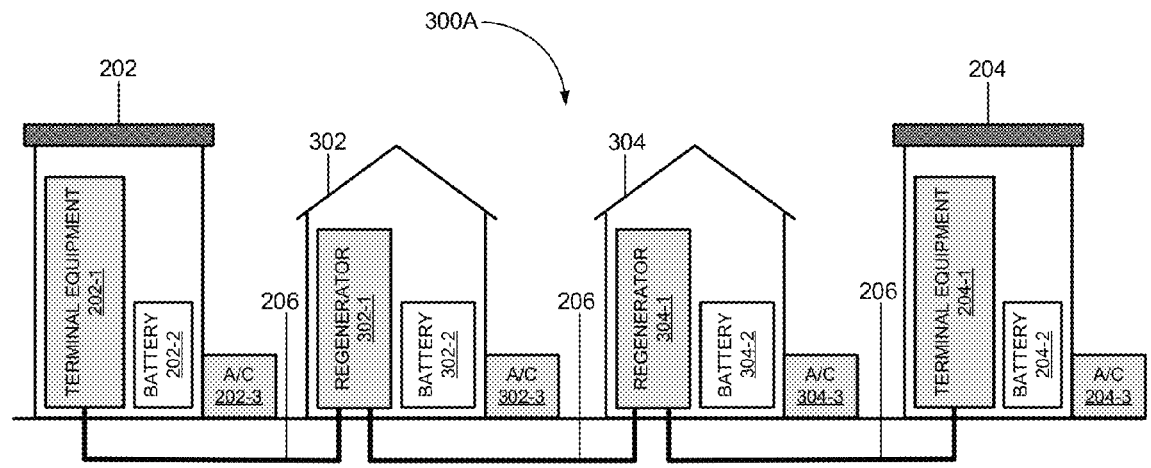

FIG. 3A is a diagram of yet another exemplary portion 300A of optical network 100. Portion 300A may be part of metro/regional network 102, metro/regional network 104, or long haul optical lines 106. As shown, portion 300A may include central office hubs 202 and 204, optical fibers 206, and node facilities 302 and 304. Depending on the implementation, portion 300A may include additional node facilities that are approximately 30 to 80 km apart.

Node facility 302 and node facility 304 may include legacy regenerator nodes 302-1 and 304-1 and batteries 302-2 and 304-2 that correspond to components 208-1, 210-1, 208-2, and 210-2 of node facilities 208 and 210, respectively. In addition, node facilities 302 and 304 may include air conditioning units 302-3 and 304-3, respectively. Air conditioning units 302-3 and 304-3 may provide stable environments (e.g., constant temperature) for node facilities 302 and 304.

In contrast to SH repeater nodes 208-1 and 210-1, legacy regenerator nodes 302-1 and 304-1 may be large, and therefore, may occupy more space. Furthermore, legacy regenerator nodes 302-1 and 302-2 may not be environmentally hardened, and may require the inclusion of air conditioning units 302-3 and 304-3, resulting in increased power consumption.

In implementations that are similar to the one shown in FIG. 3A, but with more node facilities, optical signal may be regenerated at each of the node facilities, which may be 30-80 km apart. With advances in modern optical communication technology, however, the optical signal may only need to be boosted in power once every ~20-30 km, and regenerated once every ~1,000 km. Consequently, many of regenerator facilities, such as, for example, regenerator facility 302, that are 30 to 80 km apart, may be replaced with node facilities that include optical amplifiers or SH repeater nodes instead of legacy regenerator nodes.

Figure 3B:
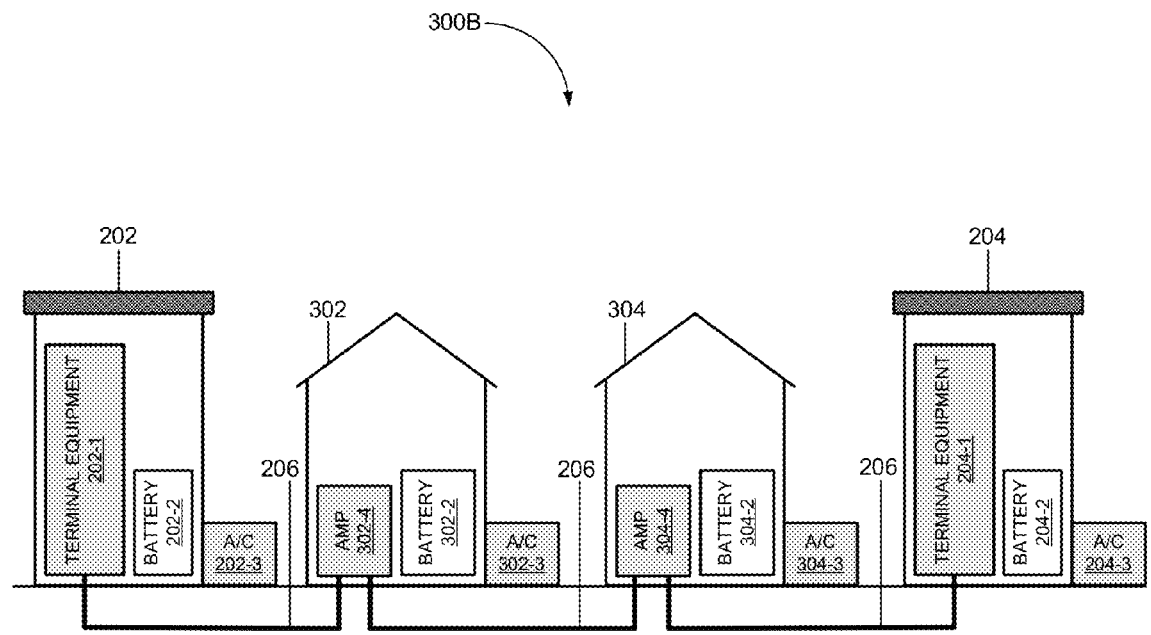

FIG. 3B is a diagram of portion 300B of optical network 100 in which regenerator nodes are replaced with amplifiers. As shown in FIG. 3B, portion 300B may include similar components as portion 300A in FIG. 3A. However, in contrast to FIG. 3A, node facilities 302 and 304 in FIG. 3B may include amplifiers 302-4 and 304-4, respectively, instead of legacy regenerator nodes 302-1 and 304-1 in FIG. 3A.

Because amplifiers 302-4 and 304-4 may be small (e.g., size of notebook) relative to legacy regenerator nodes 302-1 and 304-1, it may be possible to decrease the size of the housing for node facilities 302 and 304 by using amplifiers 302-4 and 304-4 in place of legacy regenerator nodes 302-1 and 304-1.

In addition, SH repeater nodes 208-1 and 210-1 (FIG. 2A), which may include optical amplifiers, may also be used instead of legacy regenerator nodes 302-1 and 304-1 in node facilities 302 and 304 to reduce the size of the housing. In such an implementation, because SH repeater nodes 208-1 and 210-1 may be environmentally hardened, air conditioning units 302-3 and 304-3 can be eliminated.

Figure 4:
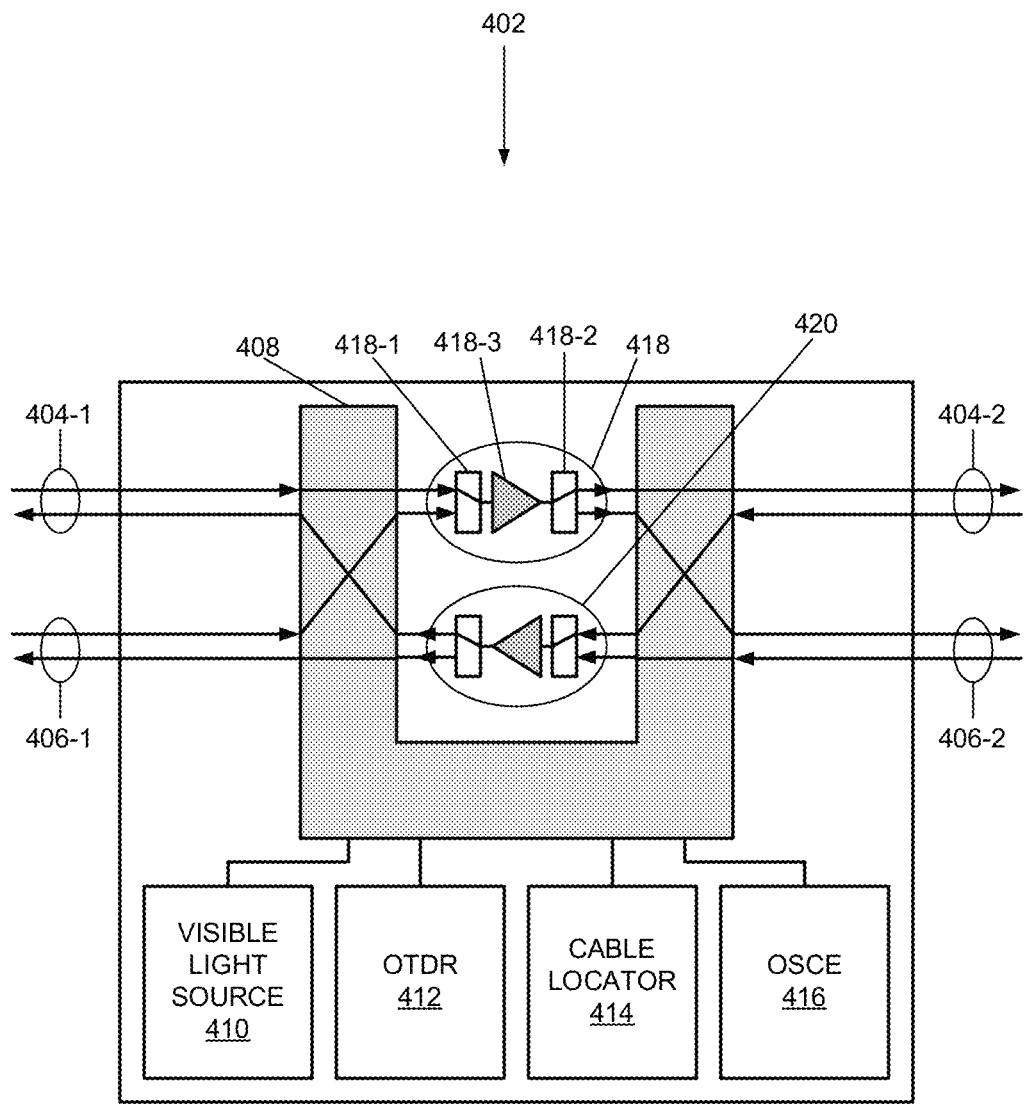
FIG. 4 is a diagram of an exemplary self-healing (SH) repeater node of FIGS. 2A and/or 2B.

FIG. 4 is a diagram of an exemplary SH repeater node 402. SH repeater node 402 may represent any of SH repeater nodes 208-1, 210-1, 218-1, and 220-1. As shown, SH repeater node 402 may include primary fibers 404-1 and 404-2, backup fibers 406-1 and 406-2, automated fiber patch panel 408, visible light source 410, optical time domain reflectometer (OTDR) 412, cable locator 414, optical service channel (OSC) equipment 416, and amplifier modules 418 and 420. Depending on the implementation, SH repeater node 402 may include additional, fewer, or different components than those illustrated in FIG. 4. For example, in one implementation, SH repeater node 402 may include a fiber optics switch (FOS).

Primary fibers 404-1 and 404-2 may carry optical signals to/from remote devices. Each of primary fibers 404-1 and 404-2 may include a pair of optical fibers. Backup fibers 406-1 and 406-2 may carry optical signals when one or both of the pairs of optical fibers of primary fibers 404-1 and/or 404-2 fail.

Each of fibers in primary fibers 404-1 and 404-2 and backup fibers 406-1 and 406-2 may provide a large number of individual data/service channels (e.g., 80 channels) via which data may be transmitted. In one implementation, the optical fibers may carry troubleshooting and/or error messages in a service channel to/from a remote device, without interfering with other messages on data channels on the same optical fiber.

In some implementations, primary fibers 404-1 and 404-2 and backup fibers 406-1 and 406-2 may carry optical signals that are wavelength division multiplexed (WDM), In WDM, multiple optical carrier signals are transmitted on a single optical fiber by using different wavelengths of laser light or electromagnetic radiation. In some implementations, optical signals may be dense wave division multiplexed (DWDM). DWDM uses the C band (i.e., frequencies between 1530 and 1565 nanometers (nm)) and/or L band (i.e., wavelengths between 1565 and 1625 nm).

Automated fiber patch panel 408 may include optical ports to which different components of SH repeater node 402 (e.g., primary fibers 404-1) may be attached and may send/or receive optical signals. In addition, depending on the configuration, automated fiber patch panel 408 may optically couple two of the ports, such that an optical signal received at one of the coupled ports is routed to the other.

For example, in FIG. 4, automated fiber patch panel 408 may couple a port (not shown in FIG. 4) that is connected to one of primary fibers 404-1 to a port (not shown in FIG. 4) connected to amplifier module 418. Accordingly, an optical signal may travel from one of primary fibers 404-1 to amplifier module 418 via automated fiber patch panel 408.

Visible light source 410 may include a source of light that may be used to locate a particular optical fiber. A field engineer may direct visible light source 410 into a selected optical fiber, for example, to physically see which optical fiber end emits the light.

OTDR 412 may include instruments to measure parameters that are associated with an optical fiber. In one implementation, OTDR 412 may transmit optical pulses into an end of an optical fiber, and monitor, at the same end, pulses that are reflected from various points on the fiber where the index of refraction changes. OTDR 412 may detect and/or record the strength of reflected pulses and times at which the reflected pulses are received. Such information may be used to characterize the fiber (e.g., locate breaks in the fiber).

Cable locator 414 may emit electrical signals (e.g., encoded physical coordinates) to allow a field engineer to locate SH repeater node 402 by using a receiver/decoder.

OSC equipment 416 may send/receive information over service channels, via primary fibers 404-1 or 404-2 and/or backup fibers 406-1 or 406-2. For example, when OSC equipment 416 detects a break in primary fibers 404-2, OSC equipment 416 may send data that is provided by OTDR 412 to a remote device. In addition, OSC equipment 416 may receive commands/requests from the remote device to reconfigure SH repeater node 402 or to perform tests to isolate a fault/flaw on an optical fiber.

Amplifier module 418 and 420 may amplify an optical signal. For example, amplifier module 418 may amplify an optical signal that is received from one of primary fibers 404-1 and output the amplified signal to one of primary fibers 404-2 via automated fiber patch panel 408.

As further shown in FIG. 4, amplifier module 418 may include switches 418-1 and 418-2 and an optical amplifier 418-3. Depending on the implementation, amplifier module 418 may include additional, fewer, or different components than those illustrated in FIG. 4.

Switch 418-1 may select, depending on its setting or configuration, an input signal from a pair of optical fibers that include one of primary fibers 404-1 and one of backup fibers 406-1, and route the selected signal to optical amplifier 418-3. For example, in FIG. 4, when switch 418-1 is in the "up" configuration, switch 418-1 may route the optical signal from primary fibers 404-1 to optical amplifier 418-3.

Switch 418-2 may output, depending on its setting of configuration, optical signal from optical amplifier 418-3 to one of a pair of optical fibers that include one of primary fibers 404-2 and one of backup fibers 406-2. For example, in FIG. 4, when switch 418-2 is in the "up" configuration, switch 418-2 may route the optical signal from optical amplifier 418-3 to primary fibers 404-2.

Optical amplifier 418-3 may amplify optical signal received from switch 418-1 and output the amplified signal to switch 418-2. Optical amplifier 418-3 may include a primary laser pump and a backup laser pump. The backup laser pump may operate instead of the primary laser pump when the primary laser pump fails. Optical amplifier 418-3 may be smaller than legacy regenerators, such as a regenerator in regenerator node 302-1. In a different implementation, SH repeater node may include a compact, optical regenerator instead of optical amplifier 418-3.

Amplifier module 420 may include similar components as amplifier module 418 and may operate similarly.

Although not illustrated in FIG. 4, depending on the implementation, SH repeater node 402 may include additional circuits, one or more processors, logic, or mechanisms to control switches in amplifier module 418 and/or other components, such as automated fiber patch panel 408, visible light source 410, OTDR 412, cable locator 414, and/or OSC equipment 416, etc. For example, in one implementation, OSC equipment 416 may include a processor for communicating with a remote device over a service channel (e.g., receive a command to conduct a test using OTDR 412), for monitoring and/or controlling OTDR 412 (e.g., obtain measurement of magnitude of reflected optical pulses), for reconfiguring switch settings for switches 418-1 and 418-2), and/or for performing other functions (e.g., report the failure of a primary laser pump, activating the backup pump, etc.). In a different implementation, SH repeater node 402 may include such a processor or control circuit as a separate component. The component may configure automated fiber patch panel 408, to cause automated fiber patch panel 408 to couple two specific ports.

Figure 5:
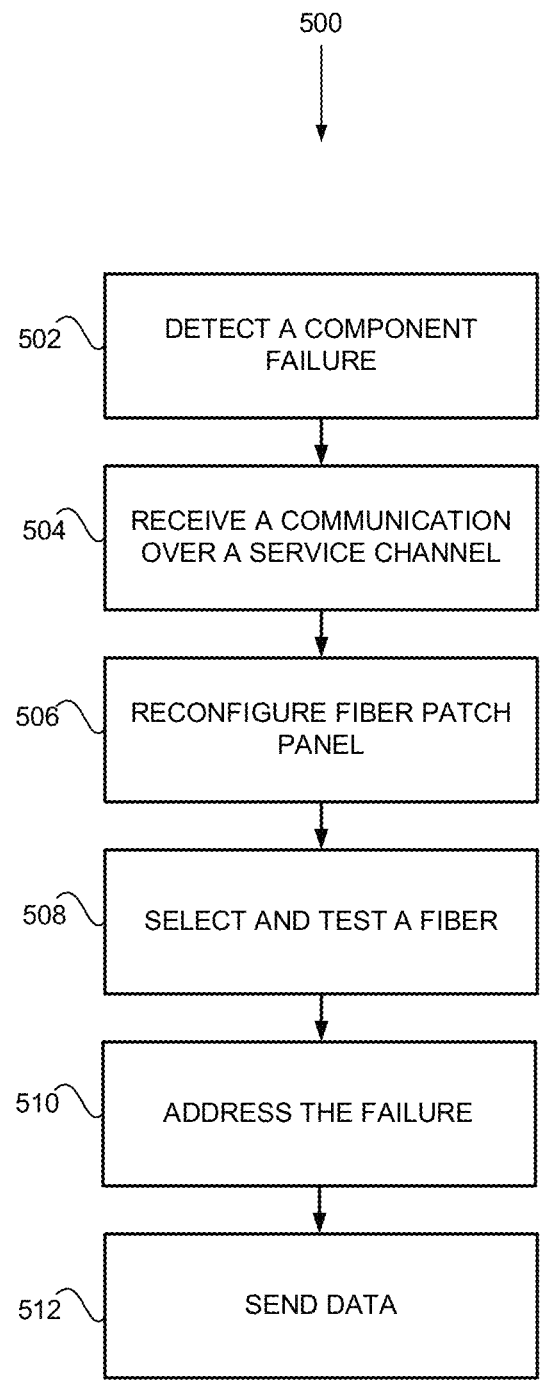
FIG. 5 is a flow diagram of an exemplary process that is associated with operation of the SH repeater node of FIG. 4.

FIG. 5 is a flow diagram of an exemplary process 500 that is associated with operation of SH repeater node 402. Although process 500 is depicted as starting at block 502, in different embodiments, process 500 may start at other blocks. In addition, depending on situations or the configuration of SH repeater node 402, each block may be performed independently of other blocks.

SH repeater node 402 may detect a component failure (block 502). In one example, SH repeater node 402 may detect a failure of the primary laser pump in optical amplifier 418-3. In another example, SH repeater node 402 may detect a break in primary fibers 404-2 by sending test pulses at one end of primary fibers 404-2, and monitoring reflected pulses at the same end.

When SH repeater node 402 detects the failure, SH repeater node 402 may send a message to a remote device over a service channel (block 502). For example, assume that SH repeater node 402 has tested primary fibers 404-2 and detected a break. SH repeater node 402 may send one or more messages that describe the test (e.g., magnitudes of transmitted pulses, magnitudes of reflected pulses, time differences between the transmitted and reflected pulses, etc.) to the remote device. In another example, SH repeater node 402 may send a message to the remote device about a failure of the primary laser pump in optical amplifier 418-3.

SH repeater node 402 may receive a communication over a service channel (block 504). For example, SH repeater node 402 may receive a command from a remote device. The command may instruct SH repeater node 402 to address the failure (e.g., activate a backup laser pump, reroute an optical signal to backup fibers 406-2, etc.), test specific fibers (e.g., primary fibers 404-1, backup fibers 406-1, etc.), to reconfigure automatic fiber patch panel 408, to provide information (e.g., a result of testing a fiber) to the remote device, and/or to perform any other functions that are associated with changing the configuration of SH repeater node 402.

SH repeater node 402 may reconfigure automated fiber patch panel 408 (block 506). For example, assume that SH repeater node 402 receives a command to test primary fibers 404-2. In such an instance, SH repeater node 402 may cause automated fiber patch-panel 408 to couple a port connected to OTDR 412 and a port connected to primary fibers 404-2. This may provide an optical path between OTDR 412 and primary fibers 404-2.

SH repeater node 402 may select and test an optical fiber (block 508). For example, assume that SH repeater node 402 receives a command from a remote device to test primary fibers 404-1. In such an instance, SH repeater node 402 may cause automated fiber patch panel 408 to provide an optical path from OTDR 412 to primary fibers 404-1, and direct OTDR 412 to perform a test on primary fibers 404-1. Consequently, OTDR 412 may send a series of pulses at one end of primary fibers 404-1 and monitor reflected pulses at the same end. After performing the test, OTDR 412 may provide a test result (e.g., data) to OSC equipment 416, which may send the test result to the remote device over primary fibers 404-1.

SH repeater node 402 may address the component failure (block 510). For example, SH repeater node 402 may activate the backup laser pump in amplifier 418-3 to operate in place of the failed primary laser pump in amplifier 418-3. In another example, referring to FIG. 4, assume one of primary fibers 404-1 that carries an incoming optical signal fails. Upon detecting the failure, SH repeater node 402 may reconfigure switch 418-1, such that amplifier 418-3 no longer receives optical signals from primary fibers 404-1, but from backup fibers 406-1. Similarly, SH repeater node 402 may modify configurations of other switches (e.g., switch 418-2, switches in amplifier module 420, etc.) to change other optical paths through SH repeater node 402.

SH repeater node 402 may send data to a remote device (block 512). Depending on the circumstance, SH repeater node 402 may send data (e.g., data from testing optical fibers, information about a failed pump, etc.) in response to a request from the remote device or as a result of performing a test.

Figure 6:
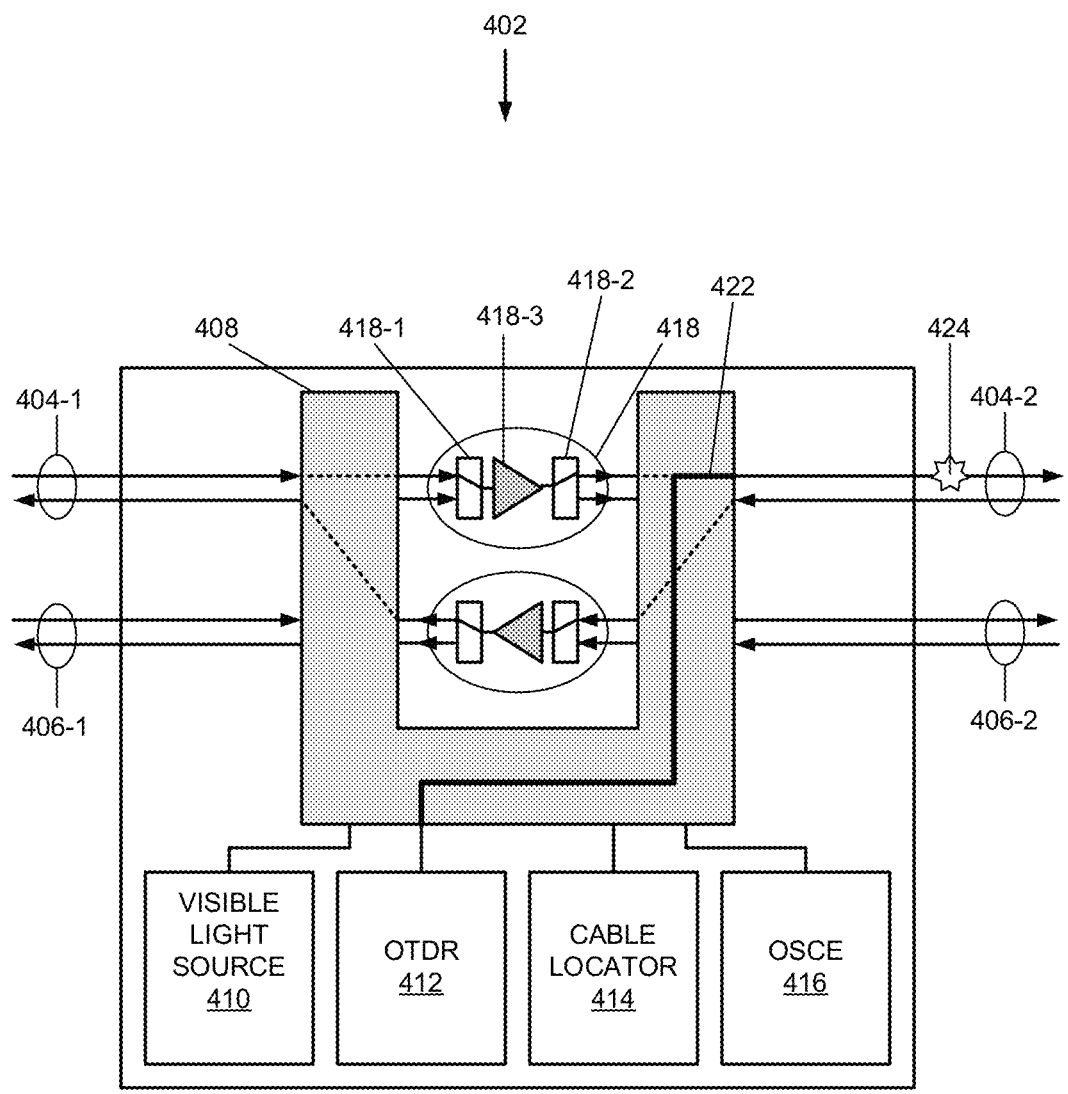
FIGS. 6 and 7 illustrate an example of the operation of the SH repeater node of FIG. 4.
Figure 7:
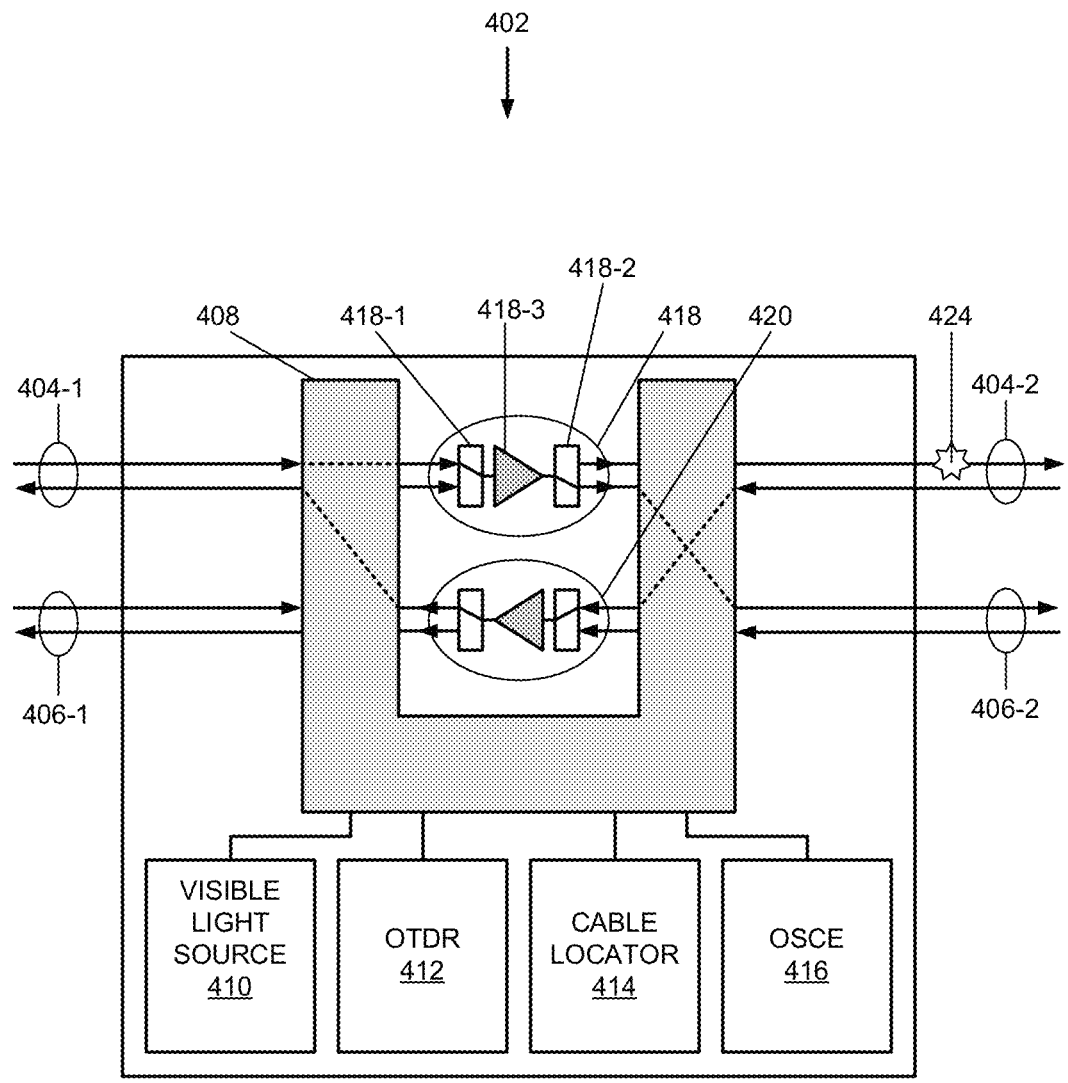

The following example, in conjunction with FIGS. 6 and 7, illustrates processes involved in operation of SH repeater node 402 in accordance with implementations described above.

In the example, as illustrated in FIG. 6, assume that one of primary fibers 404-2 includes a break 424. Also assume that a user at a remote device decides to perform a diagnostic test on SH repeater node 402. In FIG. 6, optical paths through automated fiber patch 408 are shown in dotted lines. As explained above, each optical path may couple two optical ports of automated fiber patch 408.

The user sends a command to SH repeater node 402 from a remote device. Via OSC equipment 416, SH repeater node 402 receives the command over an un-broken optical fiber of primary fibers 404-2. The command instructs SH repeater node 402 to conduct a diagnostic test on primary fibers 404-2.

Upon receiving the command, SH repeater node 402 reconfigures automated fiber patch panel 408 so that OTDR 412 is coupled to primary fibers 404-2 via an optical path, which is shown in FIG. 6 as optical path 422. Subsequently, OTDR 412 sends optical pulses to one of primary fibers 404-2, and monitors reflected optical signals. SH repeater node 402 collects data from the OTDR 412, and sends the data to the remote device over a service channel via the unbroken fiber of primary fibers 404-2.

From examining the data, the user determines that there is break 424 on primary fibers 402-1 and decides to deploy backup fibers 406-2. The user sends a command over the service channel to reconfigure amplifier module 418.

Upon receiving the command, SH repeater node 402 reconfigures switch 418-2 in amplifier module 418 to reroute the optical signal from the output of optical amplifier 418-3 to one of backup fibers 406-2. Optical paths that result from the reconfiguration are shown in FIG. 7 as dotted lines.

Later, when a field engineer visits a node facility that houses SH repeater node 402 for maintenance, the field engineer activates cable locator 414, which transmits a homing signal. Upon locating the node facility, the field engineer detaches and examines primary and backup fibers 404-1, 404-2, 406-1, and 406-2, and re-attaches them to correct ports on automated fiber patch panel 408. In addition, the field engineer replaces the broken optical fiber.

The above example illustrates how SH repeater node 402 may operate. More generally, as described prior to the example, SH repeater node 402 may be used instead of an optical regenerator node and/or amplifier node. When a component of SH repeater node 402 fails (e.g., an optical fiber, an amplifier pump, etc.), SH repeater node 402 may detect the failure and/or fix the component. For example, if an optical fiber breaks, SH repeater node 402 may detect the break, may allow a network operator to test the broken fiber, may identify the location of the break, and may route optical signal that travels on the fiber to another fiber. SH repeater node 402 may perform these operations automatically or in accordance with commands issued from a remote device.

In addition, SH repeater node 402 may be compact. Typically, a legacy regenerator or amplifier is installed in a large housing to provide convenient access to an engineer, service person, etc. Because SH repeater node 402 is capable of repairing itself, it may not need to provide such access, and consequently, may be placed in a compact container, manhole, hand hole, etc. In addition, because SH repeater node 402 is environmentally hardened, it may withstand temperature changes, moisture, wind, radiation, vibration, etc.

SH repeater node 402 may integrate many different components (e.g., a test equipment for remote troubleshooting) to lower the failures-in-time, and to support, if necessary, local maintenance activity. In addition, SH repeater node 402 may be energy efficient.

In this specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while a series of blocks have been described with regard to the process illustrated in FIG. 5, the order of the blocks may be modified in other implementations. In addition, non-dependent blocks may represent blocks that can be performed in parallel.

No element, block, or instruction used in the present application should be construed as critical or essential to the implementations described herein unless explicitly described as such. Also, as used herein, the article "a" is intended to include one or more items. Further, the phrase "based on" is intended to mean "based, at least in part, on" unless explicitly stated otherwise.

What is claimed is:

1. A method comprising:
   providing, in an optical node in an optical network, a test configuration for routing a test signal, transmitted from a test component of the optical node, over a primary optical fiber;
   performing, using the test signal and the test configuration, testing associated with an optical path through the optical node, to identify one or more faults associated with the optical path;
   sending, via an optical service channel carried on the primary optical fiber, one or more messages including information regarding the identified one or more faults to a remote device in the optical network;

receiving, responsive to the one or more messages and via the optical service channel, one or more instructions issued from the remote device to address the identified one or more faults; and addressing, using one or more components of the optical node, the identified one or more faults based on the one or more instructions, wherein when the identified one or more faults comprise a break detected in the primary optical fiber in a portion of the optical path, the addressing comprises reconfiguring one or more 1×2 optical switches in an optical amplifier module in the optical path to reroute an optical signal over a backup optical fiber in lieu of the primary optical fiber.

2. The method of claim 1, further comprising:
receiving, via the optical service channel, a command to perform the testing, wherein providing a test configuration comprises:
providing, responsive to the command, the test configuration via an automated patch panel of the optical node.

3. The method of claim 1, wherein the
optical node comprises a repeater node.

4. The method of claim 1, wherein when the identified one or more faults further comprise a detected failure of a primary pump of the optical amplifier module, the addressing further comprises:
activating, responsive to the one or more instructions, a backup pump of the optical amplifier module; and
reconfiguring, responsive to the one or more instructions, the optical amplifier module to reroute an optical signal to the activated backup pump and to bypass the failed primary pump.

5. The method of claim 4, wherein the reroute of an optical signal to the activated backup pump and bypass of the failed primary pump comprises:
rerouting the optical signal to a backup laser pump and bypassing a primary laser pump.

6. The method of claim 4, further comprising:
sending, via the optical service channel and to the remote device, data indicative of at least one of:
the activating of the backup pump, or
the reconfiguring of the optical amplifier module.

7. The method of claim 1, wherein performing testing comprises:
using an optical time domain reflectometer to measure parameters that are associated with reflected test pulses.

8. A system comprising:
an optical node including logic and one or more processors to execute the logic to:
provide a test configuration for routing a test signal, transmitted from a test component of the optical node, over a primary optical fiber;
perform, using the test signal and the test configuration, testing associated with an optical path through the optical node, to identify one or more faults associated with the optical path;
send, via an optical service channel carried on the primary optical fiber, one or more messages including information regarding the identified one or more faults to a remote device in an optical network;
receive, responsive to the one or more messages and via the optical service channel, one or more instructions issued from the remote device to address the identified one or more faults; and
address, using one or more components of the optical node, the identified one or more faults based on the one or more instructions, wherein when the identified one or more faults comprise a break detected in the primary optical fiber in a portion of the optical path, the one or more processors further execute the logic to reconfigure one or more 1×2 optical switches in an optical amplifier module in the optical path to reroute optical communications over a backup optical fiber in lieu of the primary optical fiber.

9. The system of claim 8, the one or more processors to further execute the logic to:
receive, via the optical service channel, a command to perform the testing, wherein to provide a test configuration the one or more processors are further configured to:
provide, responsive to the command, the test configuration via an automated patch panel of the optical node.

10. The system of claim 8, wherein when the identified one or more faults further comprise a detected failure of a primary pump of the optical amplifier module, the one or more processors to further execute the logic to:
activate, responsive to the one or more instructions, a backup pump of the optical amplifier module; and
reconfigure, responsive to the one or more instructions, the optical amplifier module to reroute optical communications to the activated backup pump and to bypass the failed primary pump.

11. The system of claim 10, wherein to reroute the optical signal, the one or more processors to further execute the logic to:
reroute the optical signal to a backup laser pump and bypass a primary laser pump.

12. The system of claim 10, the one or more processors to further execute the logic to:
send, via the optical service channel and to the remote device, data indicative of at least one of:
the activation of the backup pump, or
the reconfiguration of the optical amplifier module.

13. The system of claim 8, wherein to perform the testing, the one or more processors to further execute the logic to:
use an optical time domain reflectometer to measure parameters that are associated with reflected test pulses.

14. An optical device comprising:
a primary optical fiber to conduct at least one of input optical data received from an optical network or output optical data outputted to the optical network;
an optical amplifier module to amplify the input optical data; and
one or more processors configured to:
provide a test configuration for routing a test signal, transmitted from a test component of the optical device, over the primary optical fiber;
perform, using the test signal and the test configuration, testing associated with an optical path through the optical device, to identify one or more faults associated with the optical path;
send, via an optical service channel carried on the primary optical fiber, one or more messages including information regarding the identified one or more faults to a remote device via the optical network;
receive, responsive to the one or more messages and via the optical service channel, one or more instructions issued from the remote device to address the identified one or more faults; and
address, using one or more components of the optical device, the identified one or more faults based on the one or more instructions, wherein when the identified one or more faults comprise a break detected in the primary optical fiber in a portion of the optical path, the one or more processors are further configured to reconfigure one or more 1×2 optical switches in the optical amplifier module to reroute an optical signal over a backup optical fiber in the optical device, in lieu of the primary optical fiber.

15. The optical device of claim 14, further comprising an automated patch panel, wherein the one or more processors are further configured to:
   receive, via the optical service channel, a command to perform the testing, and
   provide, responsive to the command, the test configuration via the automated patch panel.

16. The optical device of claim 14, wherein when the identified one or more faults further comprise a detected failure of a primary pump of the optical amplifier module, the one or more processors are further configured to:
   activate, responsive to the one or more instructions, a backup pump of the optical amplifier module; and
   reconfigure, responsive to the one or more instructions, the optical amplifier module to reroute an optical signal to the activated backup pump and to bypass the failed primary pump.

17. The optical device of claim 16, wherein to reroute the optical signal, the one or more processors are further configured to:
   reroute the optical signal to a backup laser pump and bypass a primary laser pump.

18. The optical device of claim 16, wherein the one or more processors are further configured to:
   send, via the optical service channel and to the remote device, information indicative of at least one of:
      the activation of the backup pump, or
      the reconfiguration of the optical amplifier module.

19. The optical device of claim 14, wherein to perform the testing, the one or more processors are configured to:
   use an optical time domain reflectometer to measure parameters that are associated with reflected test pulses.

20. The optical device of claim 14, wherein the optical device comprises a repeater node.

\* \* \* \* \*